United States Patent [19]
Wallner et al.

[11] Patent Number: 5,918,898
[45] Date of Patent: *Jul. 6, 1999

[54] SIDE IMPACT AIR BAG MODULE

[75] Inventors: John P. Wallner, Rochester; Michael P. Pionk, Marysville, both of Mich.

[73] Assignee: TRW Vehicle Safety Systems Inc., Lyndhurst, Ohio

[*] Notice: This patent is subject to a terminal disclaimer.

[21] Appl. No.: 08/787,248

[22] Filed: Jan. 24, 1997

Related U.S. Application Data

[63] Continuation-in-part of application No. 08/601,721, Feb. 15, 1996, Pat. No. 5,704,634.

[51] Int. Cl.⁶ .................................................. B60R 21/26
[52] U.S. Cl. ...................................... 280/728.2; 280/740
[58] Field of Search .............................. 280/728.2, 740, 280/742, 736, 737, 741, 730.2, 730.1, 732, 728.1

[56] References Cited

U.S. PATENT DOCUMENTS

| | | | |
|---|---|---|---|
| 3,527,472 | 9/1970 | Chute et al. | 280/740 |
| 3,567,245 | 3/1971 | Ekstrom | 280/737 |
| 4,153,273 | 5/1979 | Risko | 280/740 |
| 4,981,534 | 1/1991 | Scheffee | 280/741 |
| 5,131,680 | 7/1992 | Coultas et al. | 280/737 |
| 5,195,777 | 3/1993 | Cuevas | 280/742 |
| 5,308,108 | 5/1994 | Rion | 280/728.2 |
| 5,348,342 | 9/1994 | Haland et al. | 280/730.2 |
| 5,458,362 | 10/1995 | Buchanan et al. | 280/728.2 |
| 5,468,012 | 11/1995 | Mihm | 280/728.2 |
| 5,484,163 | 1/1996 | Jenkins | 280/728.2 |
| 5,558,362 | 9/1996 | Acker et al. | 280/728.2 |
| 5,611,563 | 3/1997 | Olson et al. | 280/728.2 |

FOREIGN PATENT DOCUMENTS

| | | |
|---|---|---|
| 0680851 | 11/1995 | European Pat. Off. . |
| 0694446 | 1/1996 | European Pat. Off. . |

*Primary Examiner*—Peter C. English
*Attorney, Agent, or Firm*—Tarolli, Sundheim, Covell, Tummino & Szabo

[57] ABSTRACT

An air bag module (10*b*) includes an elongate inflator (40*b*) having first and second axially spaced outer surface portions (72*b*, 82*b*). A tubular retainer assembly (100*b*, 170*b*) at least partially encloses the inflator (40*b*). To secure the inflator (40*b*) and the retainer assembly (100*b*, 170*b*) together, a first clamping portion (110*b*) of the retainer assembly engages the first outer surface portion (72*b*) of the inflator and blocks movement of the first outer surface portion of the inflator relative to the retainer assembly. A second clamping portion (120*b*, 170*b*) of the retainer assembly (100*b*, 170*b*) engages the second outer surface portion (70*b*) of the inflator (40*b*) and blocks movement of the second outer surface portion of the inflator relative to the retainer assembly.

16 Claims, 6 Drawing Sheets

SIDE IMPACT AIR BAG MODULE

RELATED APPLICATION

This application is a continuation-in-part of U.S. patent application Ser. No. 08/601,721, filed Feb. 15, 1996, by the same inventors, entitled "Side Impact Air Bag Module", now U.S. Pat. No. 5,704,634.

BACKGROUND OF THE INVENTION

1. Technical Field

The present invention relates to a vehicle safety apparatus and particularly relates to an air bag module including an inflatable vehicle occupant protection device, such as an air bag, for helping to protect a vehicle occupant in the event of a side impact to the vehicle.

2. Description of the Prior Art

It is known to inflate an air bag to help protect a vehicle occupant in the event of a side impact to a vehicle of a magnitude above a predetermined threshold. The air bag is stored in a deflated condition, together with an inflator, in a vehicle seat, for example. In the event of a side impact to the vehicle of a magnitude above the predetermined threshold, the inflator is actuated, and the air bag is inflated into a position between the vehicle occupant in the vehicle seat and the adjacent side structure of the vehicle such as a door or window of the vehicle or a body panel of the vehicle. The air bag helps protect the vehicle occupant from forcefully being struck by parts of the side structure of the vehicle. The air bag can also help protect the vehicle occupant from objects which might intrude into the vehicle, such as a pole or a tree, during the side impact.

SUMMARY OF THE INVENTION

The present invention is an air bag module comprising an elongate inflator having first and second axially spaced outer surface portions, and a tubular retainer assembly at least partially enclosing the inflator. Means for securing the inflator and the retainer assembly together consists of (a) a first clamping portion of the tubular retainer assembly engaging the first outer surface portion of the inflator and blocking movement of the first outer surface portion of the inflator relative to the tubular retainer assembly, and (b) a second clamping portion of the tubular retainer assembly engaging the second outer surface portion of the inflator and blocking movement of the second outer surface portion of the inflator relative to the tubular retainer assembly.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
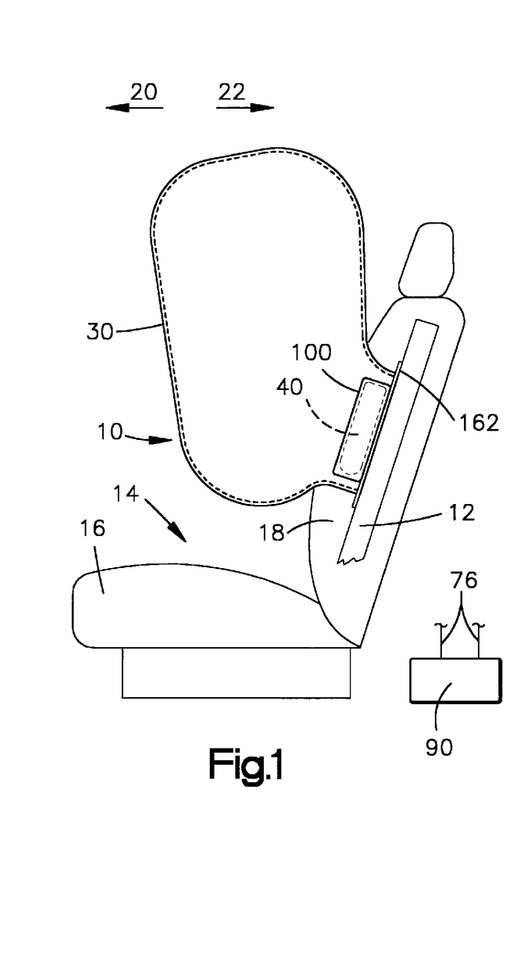
FIG. 1 is a schematic side elevational view of a vehicle seat and an air bag module constructed in accordance with the present invention, showing the air bag in an inflated condition.
Figure 2:
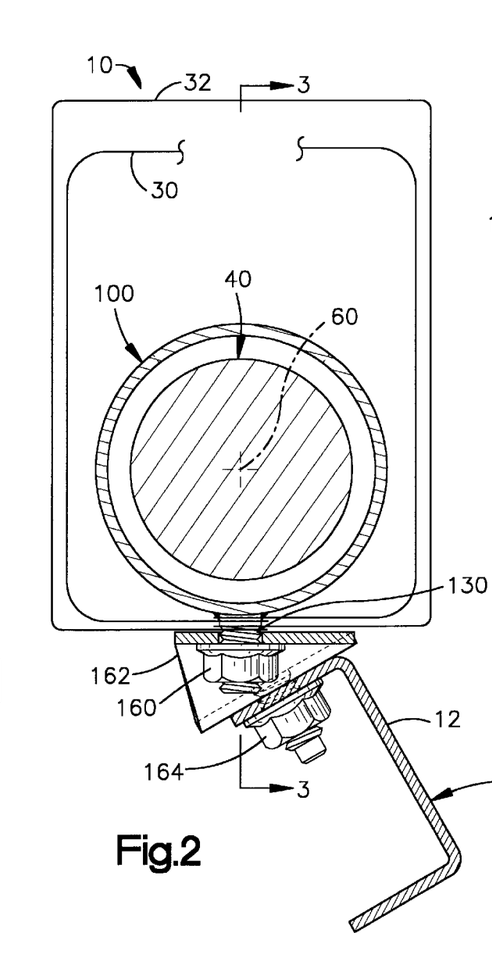
FIG. 2 is a schematic view, partially in section, of a portion of the air bag module of FIG. 1.
Figure 3:
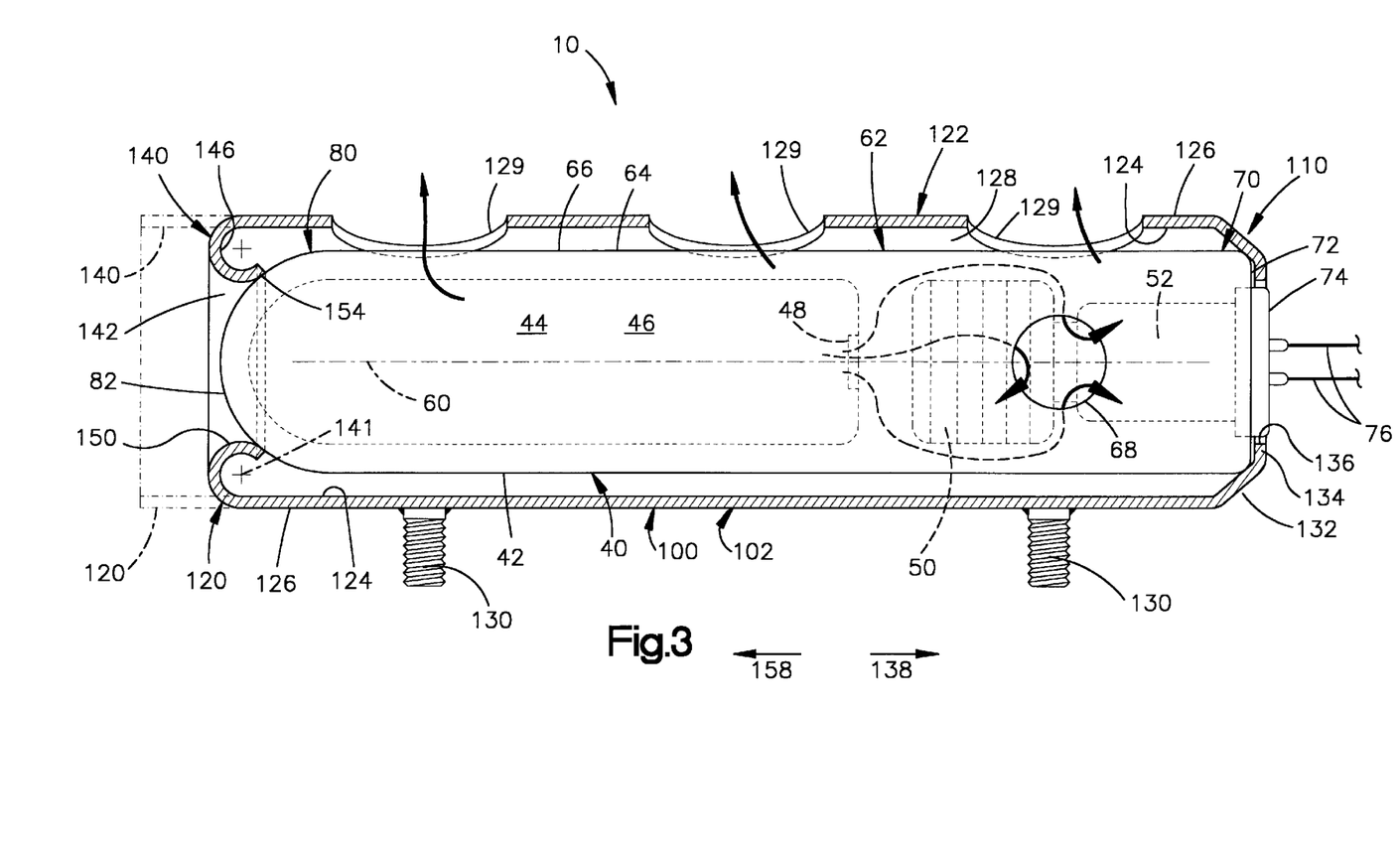
FIG. 3 is a sectional view of an inflator and a diffuser which form a part of the air bag module of FIG. 1 taken generally along line 3—3 of FIG. 2.

The present invention relates to a vehicle safety apparatus, and particularly relates to an air bag module including an inflatable vehicle occupant protection device, such as an air bag, for helping to protect a vehicle occupant in the event of a side impact to the vehicle of a magnitude sufficient to require inflation of the inflatable device. The present invention is applicable to various vehicle safety apparatus constructions. As representative of the present invention, FIGS. 1–3 illustrate a vehicle safety apparatus or air bag module 10.

The air bag module 10 (FIG. 1) is connected with a seat frame member 12 of a seat 14 for an occupant of a vehicle. The seat 14 includes a seat bottom cushion 16 and a seatback 18 connected with the seat bottom cushion. A forward direction in the vehicle is indicated by the arrow 20 (FIG. 1) and a rearward direction in the vehicle is indicated by the arrow 22.

The air bag module 10 includes an inflatable device, illustrated schematically at 30, which is commonly known as an air bag. The air bag 30 is preferably made from a fabric material such as woven nylon. The air bag 30 can alternatively be made from a non-woven material, such as plastic film. The air bag module 10 also includes a cover indicated schematically at 32 (FIG. 2) which encloses the folded air bag 30. The cover 32 is opened by the inflating air bag 30 to enable deployment of the air bag into a position to help protect an occupant of the vehicle seat. The air bag module 10, including the cover 32, is located within the vehicle seatback 18 underneath the fabric material or leather covering of the seat.

The air bag module 10 also includes an inflator 40. The inflator 40 is illustrated as an "augment" type inflator which includes both inflation fluid stored in a container and an ignitable material for heating and thereby increasing the pressure of the inflation fluid. The module 10 alternatively could include an inflator which contains only a stored quantity of pressurized inflation fluid, or a pyrotechnic inflator which uses the combustion of gas-generating material to generate inflation fluid in the form of gas to inflate the air bag 30.

As illustrated schematically in FIG. 3, the inflator 40 includes a container 42 which defines an inflation fluid chamber 44. The inflation fluid chamber 44 contains a stored quantity of pressurized inflation fluid 46. At one end of the inflation fluid chamber 44 is a rupturable portion of the container or a rupturable member such as a burst disk 48. An ignitable material 50 is disposed within the container 42 at a location adjacent to the inflation fluid chamber 44 for, when ignited, heating inflation fluid 46 flowing from the inflation fluid chamber. An electrically actuatable igniter 52, for igniting the ignitable material 50 and for opening the inflation fluid chamber 44, is disposed adjacent to the ignitable material. A pair of lead wires 76 extend from a cylindrical end portion 74 of the igniter 52.

The inflator 40 has a generally cylindrical configuration centered on a longitudinal axis 60. A central portion 62 of the inflator 40 includes a cylindrical side wall 64 of the inflator. The side wall 64 has a cylindrical outer side surface 66. The central portion 62 of the inflator 40 also includes a plurality of fluid outlets 68 which are spaced apart 180° around the circumference of the inflator.

A first end portion 70 of the inflator 40 has a flat, radially extending end surface 72. The end portion 74 of the igniter 52 projects from the end surface 72 of the inflator 40. A second end portion 80 of the inflator 40 has a domed configuration including a convex outer surface 82. The convex outer surface 82 of the second end portion 80 of the inflator 40 merges with the cylindrical outer surface 66 of the central portion 62 of the inflator. The second end portion 80 of the inflator 40 includes one axial end portion (to the left as viewed in FIG. 3) of the inflation fluid chamber 44.

The vehicle in which the air bag module 10 is mounted includes known means indicated schematically at 90 (FIG. 1) for sensing a side impact to the vehicle and for actuating the inflator 40 in response to the sensing of a side impact. The means 90 may include a side impact sensor and vehicle circuitry for electrically actuating the inflator 40 in response to sensing a side impact to the vehicle above a predetermined threshold. The means 90 is electrically connected with the igniter 52 of the inflator 40, via the lead wires 76, for providing an actuation signal to the inflator.

The air bag module 10 also includes a diffuser 100 (FIGS. 2 and 3) which may also be referred to herein as a retainer assembly or retainer. The diffuser 100 is made from a single piece of metal and has an elongate, generally cylindrical configuration. The diffuser 100 includes a central portion 102, a first end portion 110, and a second end portion 120.

A cylindrical side wall 122 of the diffuser 100 extends for the length of the central portion 102 of the diffuser. The side wall 122 is centered on the axis 60 and has opposite inner and outer side surfaces 124 and 126. The central portion 102 of the diffuser 100, including the side wall 122, is spaced radially outward from the cylindrical outer surface 66 of the inflator 40.

An annular, axially extending, diffuser chamber 128 is defined between the side wall 122 of the diffuser 100 and the cylindrical outer surface 66 of the inflator 40. A series of circular fluid outlet openings 129 are formed in the side wall 122 of the diffuser 100 and communicate between the diffuser chamber 128 and the exterior of the diffuser. As illustrated, the openings 129 are aligned in a row centered on a line which extends parallel to the longitudinal axis 60. A pair of mounting bolts 130 extend radially outward from the side wall 122 of the diffuser 100, opposite the fluid outlet openings 129.

The first end portion 110 of the diffuser 100 is a clamping portion of the diffuser which is disposed at and supports the first end portion 70 of the inflator 40. The first end portion 110 of the diffuser 100 includes a frustoconical wall portion 132 which extends axially away from and radially inward from the cylindrical side wall 122 of the diffuser. The frustoconical wall portion 132 engages and supports the first end portion 70 of the inflator 40.

The first end portion 110 of the diffuser 100 also includes a flat, annular wall portion 134 which extends radially inward from the frustoconical wall portion 132. The wall portion 134 overlies the radially extending outer end surface 72 of the inflator 40. The wall portion 134 has a circular opening 136 which receives the cylindrical outer end portion 74 of the igniter 52. The opening 136 is preferably larger in diameter than the outer end portion 74 of the igniter 52. Alternatively, the opening 136 may engage and support the outer end portion 74 of the igniter 52.

The first end portion 70 of the inflator is thus supported on the first end portion 110 of the diffuser 100. By engaging the first end portion 70 of the inflator 40, the first end portion 110 of the diffuser 100 blocks radial movement of the first end portion of the inflator relative to the diffuser. The first end portion 110 of the diffuser 100 also blocks axial movement of the inflator 40, relative to the diffuser, in a first axial direction as indicated by the arrow 138, that is to the right as viewed in FIG. 3. The first end portion 110 of the diffuser 100 closes and seals the diffuser chamber 128 at one end, that is, to the right as viewed in FIG. 3.

A second end portion 120 of the diffuser 100 is a clamping portion of the diffuser which is disposed at and supports the second end portion 80 of the inflator 40. The second end portion 120 of the diffuser 100 comprises a curled wall portion or curl portion 140 of the diffuser. The second end portion 120 is formed as an extension of the cylindrical side wall 122 of the diffuser 100. The second end portion 120 of the diffuser has a cylindrical configuration as shown in phantom in FIG. 3 prior to assembly of the air bag module 10. The second end portion 120 of the diffuser 100 is movable from the cylindrical condition shown in phantom in FIG. 3 to the curled condition shown in solid lines in FIG. 3 during assembly of the air bag module 10.

The curl portion 140 has an arcuate cross-sectional configuration centered on a circular bending axis 141, as seen in FIG. 3. The curl portion 140 of the diffuser 100 extends radially inward from the cylindrical side wall 122 at a plurality of locations which are disposed in a circular array which is centered on the axis 60. In the preferred embodiment, the curl portion 140 of the diffuser 100 extends radially inward from the cylindrical side wall 122, in a uniform manner, for 360° around the axis 60. The curl portion 140 defines a circular opening 142 which receives the second end portion 80 of the inflator 40. An inner side surface 146 of the curl portion 140 extends as a continuation of the inner side surface 124 of the cylindrical side wall 122 of the diffuser 100.

An outer side surface 150 of the curl portion 140 extends as a continuation of the outer side surface 126 of the cylindrical side wall 122 of the diffuser 100. The outer side surface 150 of the curl portion 140 engages the convex outer surface 82 of the domed second end portion 80 of the inflator 40. This engagement occurs along a circular area or line of engagement 154 extending around and centered on the axis 60, in a uniform manner for 360° around the axis. That is, the curl portion 140 of the diffuser 100 engages and supports the inflator 40 at a plurality or series of locations which are disposed in a circular array extending around the axis 60.

The second end portion 120 of the diffuser 100 closes and seals the diffuser chamber 128 at one end, that is, to the left as viewed in FIG. 3. The second end portion 120 of the diffuser 100 blocks axial movement of the inflator 40, relative to the diffuser, in a second axial direction as indicated by the arrow 158, that is, to the left as viewed in FIG. 3. The second end portion 120 of the diffuser 100 also blocks radial movement of the second end portion 80 of the inflator 40, relative to the diffuser.

The inflator 40 is inserted into the diffuser 100 when the diffuser has a completely cylindrical configuration, that is, when the end portions 110 and 120 of the diffuser are not yet bent radially inward from the cylindrical side wall 122. The first end portion 110 of the diffuser 100 is then deformed inward into engagement with the first end portion 70 of the inflator 40. The second end portion 120 of the diffuser 100 is then curled into engagement with the second end portion 80 of the inflator 40. The inflator 40 is clamped in the diffuser 100 with an axially directed force in the range of from about 80 pounds to about 300 pounds. The inflator 40 engages, or is connected with, the diffuser 100 only at the end portions 110 and 120 of the diffuser; there is no other connection or engagement between the inflator and the diffuser.

The assembly of the inflator 40 and the diffuser 100 is then inserted into the air bag 30 and the cover 32. The mounting bolts 130 extend through fastener openings in the air bag 30 and the cover 32. The lead wires 76 extend out of the air bag 30 through another opening (not shown) in the air bag.

A pair of nuts 160 secure a mounting bracket 162 on the mounting bolts 130. The mounting bracket 162 is then secured by fasteners 164 to the seat frame member 12 in the seatback 18. The module 10 is preferably mounted on the seatback 18 so that when the seatback is reclined at an angle of 25° from the vertical and the inflator 40 is actuated, the air bag 30 deploys in a generally forward and upward direction as illustrated in FIG. 1.

In the event of a side impact to the vehicle of a magnitude for which inflation of the air bag 30 is desired to help protect the vehicle occupant, the igniter 52 is actuated. The ignitable material 50 ignites and the burst disk 48 ruptures. The inflation fluid 46 flows out of the container 42, past the ignitable material 50. As the inflation fluid 46 flows past the ignitable material 50, the inflation fluid is heated and its pressure increases. The inflation fluid 46 flows out of the inflator 40, through the fluid outlets 68 in the inflator, and into the diffuser chamber 128. The inflation fluid 46 flows out of the diffuser chamber 128, through the openings 129 in the diffuser 100, and into the air bag 30. The rapidly flowing inflation fluid causes the air bag 30 to cut through the portions of the seatback 18 which overlie the module 10, such as foam cushion material and/or fabric material or leather covering of the seat. The air bag 30 inflates from a folded, stored condition to an inflated condition as illustrated in FIG. 1.

Figure 4:
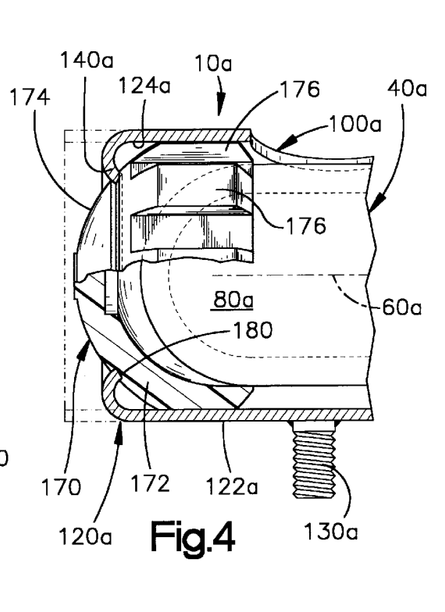
FIG. 4 is a partial sectional view of a portion of an air bag module which is constructed in accordance with a second embodiment of the present invention.

FIG. 4 illustrates a portion of an air bag module 10a which is constructed in accordance with a second embodiment of the present invention. Parts of the air bag module 10a which are the same as or similar to corresponding parts of the module 10 are given the same reference numeral with the suffix "a" added for clarity.

The air bag module 10a includes an inflator 40a which is the same as the inflator 40 (FIGS. 1–3). The module 10a includes a diffuser 100a, which may also be referred to herein as a retainer, which is generally similar to the diffuser 100 (FIGS. 1–3). In the diffuser 100a, however, the curl portion 140a does not engage the domed second end portion 80a of the inflator 40a. Instead, a cushion 170 is disposed between the curl portion 140a of the diffuser 100a and the second end portion 80a of the inflator 40a. The cushion 170 and the diffuser 100a together form a retainer assembly of the air bag module 10a.

The cushion 170 is made from a compressible material such as rubber or plastic and includes a generally hemispherical main body portion 172. The main body portion 172 of the cushion 170 is closely fitted around the domed end portion 80a of the inflator 40a. The main body portion 172 of the cushion 170 has a generally hemispherical outer side surface 174.

A plurality of ribs 176 project radially outward from the outer side surface 174 of the main body portion 172 of the cushion 170. The ribs 176 engage the inner side surface 124a of the cylindrical wall portion 122a of the diffuser 10a. The engagement of the ribs 176 with the diffuser 100a maintains the second end portion 80a of the inflator 40a at a position centered on the axis 60a.

The curl portion 140a of the diffuser 100a engages the outer side surface 174 of the main body portion 172 of the cushion 170. An annular edge 180 of the curl portion 140a extends into the material of the main body portion 172 of the cushion 170 and clamps the cushion against the second end portion 80a of the inflator 40a. The cushion 170 blocks metal to metal contact between the second end portion 120a of the diffuser 100a and the second end portion 80a of the inflator 40a.

Figure 5:
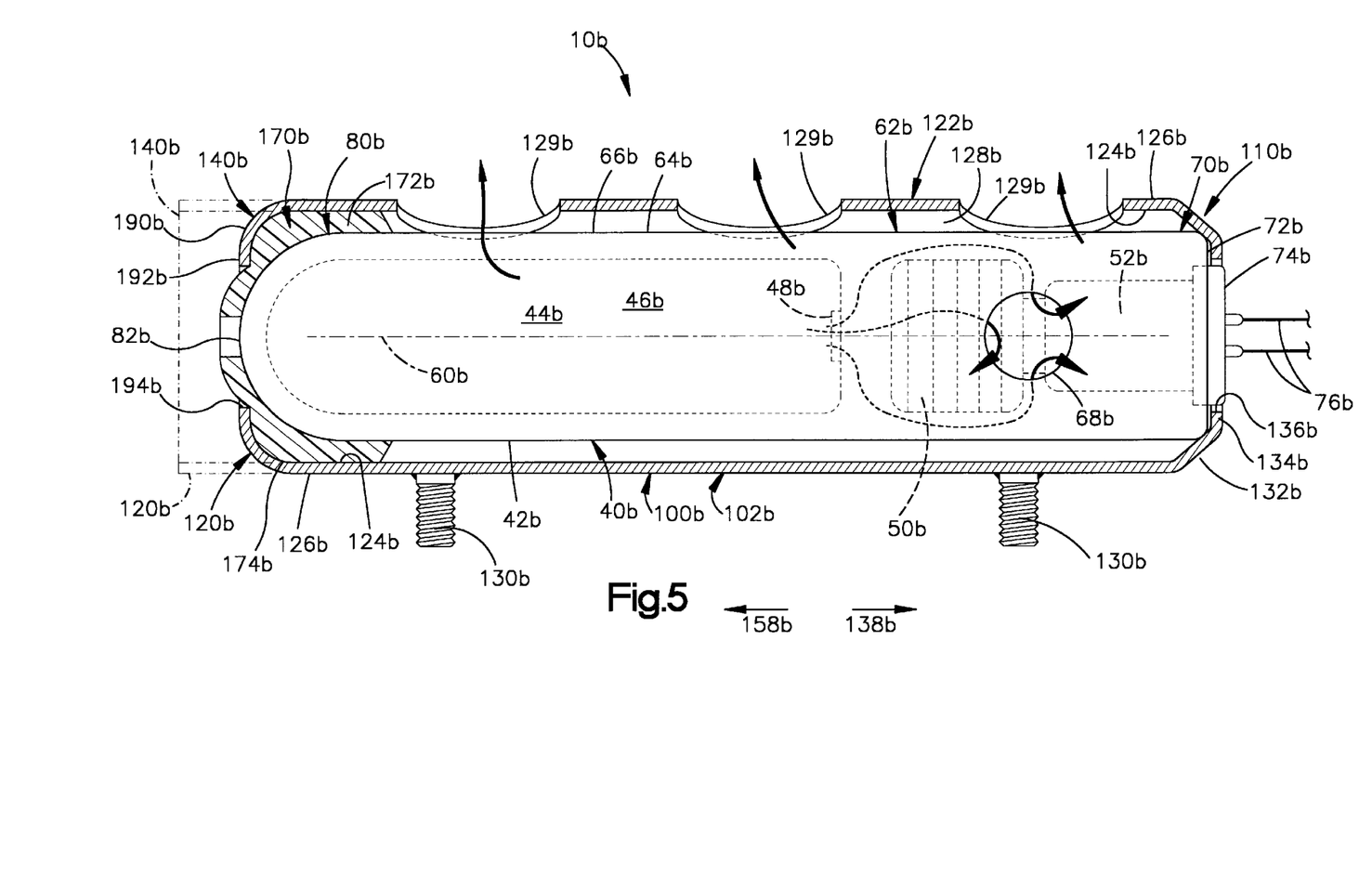
FIG. 5 is a view, similar to FIG. 3, of an inflator and a diffuser which form a part of an air bag module constructed in accordance with a third embodiment of the present invention.

FIG. 5 illustrates a portion of an air bag module 10b which is constructed in accordance with a third embodiment of the present invention. Parts of the air bag module 10b which are the same as or similar to corresponding parts of the modules 10 (FIGS. 1–3) or 10a (FIG. 4) are given the same reference numeral with the suffix "b" added for clarity.

The air bag module 10b includes an inflator 40b which is the same as the inflator 40 (FIGS. 1–3). The module 10b includes a retainer or diffuser 100b which is generally similar to the diffuser 100 (FIGS. 1–3).

A second end portion 120b of the diffuser 100b is disposed at and supports the second end portion 80b of the inflator 40b. The second end portion 120b of the diffuser 100b comprises a radially formed wall portion or radial portion 140b of the diffuser. The second end portion 120b is formed as an extension of the cylindrical sidewall 122b of the diffuser 100b. The second end portion 120b of the diffuser has a cylindrical configuration, shown in phantom in FIG. 5, prior to assembly of the air bag module 100b. The second end portion 120b of the diffuser 100b is movable from the cylindrical condition to the condition shown in solid lines in FIG. 5 during assembly of the air bag module 10b.

The radial portion 140b of the diffuser 100b is similar to the curl portion 140 of the diffuser 100 (FIGS. 1–3) with the exception that the radial portion does not curl axially toward the first end portion 110b of the diffuser. Specifically, the radial portion 140b of the diffuser 100b extends radially inward from the cylindrical side wall 122b at least at a plurality of locations which are disposed in a circular array which is centered on the axis 60b. In the preferred embodiment, the radial portion 140b of the diffuser 100b has an arcuate or hemispherical wall portion 190b which extends radially inward from the cylindrical side wall 122b, in a uniform manner, for 360° around the axis 60b. The radial portion 140b could, alternatively, be a series of discrete sections in a circular array. The arcuate wall portion 190b of the radial portion 140b of the diffuser 100b terminates in an annular, radially extending inner wall portion 192b.

A cushion 170b is disposed between the radial portion 140b of the diffuser 100b and the second end portion 80b of the inflator 40b. The cushion 170b and the diffuser 100b together form a retainer assembly of the air bag module 10b. The cushion 170b includes a generally hemispherical main body portion 172b which is closely fitted around the domed end portion 80b of the inflator 40b. The main body portion 172b of the cushion 170b has a generally hemispherical outer side surface 174b when in an undeformed condition (not shown).

The radial portion 140b of the diffuser 100b engages the outer side surface 174b of the main body portion 172b of the cushion 170b. An annular edge 194b of the radial portion 140b compresses the material of the main body portion 172b of the cushion 170b and clamps the cushion against the second end portion 80b of the inflator 40b. The cushion 170b blocks metal to metal contact between the second end portion 120b of the diffuser 100b and the second end portion 80b of the inflator 40b.

Figures 6, 7:
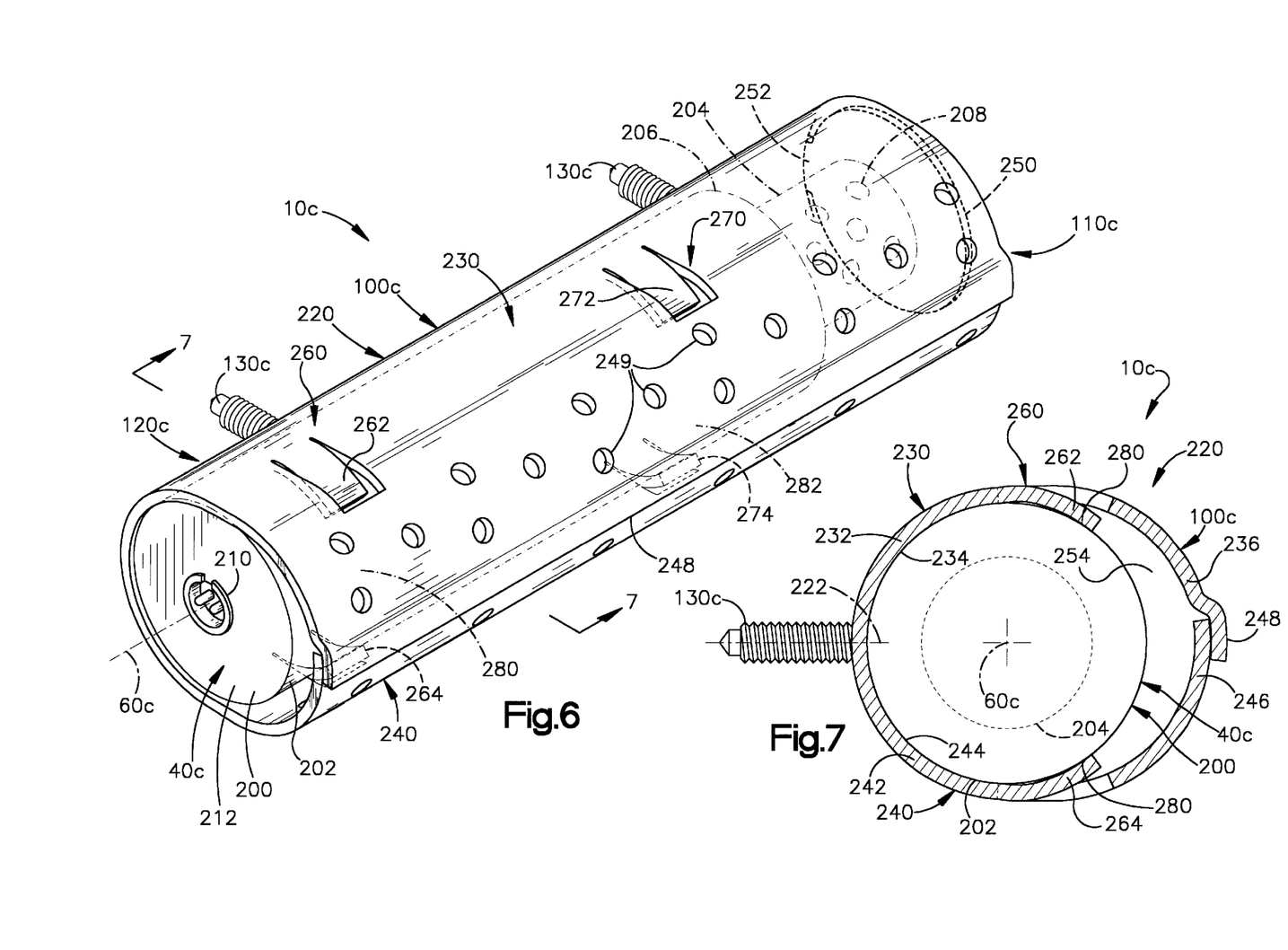
FIG. 6 is a perspective view of an air bag module constructed in accordance with a fourth embodiment of the present invention.
FIG. 7 is a sectional view taken generally along line 7—7 of FIG. 6.

FIGS. 6 and 7 illustrate portions of an air bag module 10c which is constructed in accordance with a fourth embodiment of the present invention. The air bag module 10c may be substituted for the air bag module 10, in the vehicle seat 14 (FIG. 1).

The air bag module 10c (FIGS. 6 and 7) includes an elongate inflator 40c. The inflator 40c includes a cylindrical body portion 200 having a cylindrical outer side surface 202 centered on an axis 60c of the inflator. A cylindrical neck portion 204 of the inflator 40c projects from the body portion 200 at a first end portion 206 of the inflator. The neck portion 204 is smaller in diameter than the body portion 200. The neck portion 204 includes a plurality of inflation fluid outlets 208. An electrical connector 210 is located at a second end portion 212 of the inflator 40c.

The module 10b includes a tubular retainer assembly 220 for securing the inflator 40c in position relative to the seat member 12 of the vehicle seat 14. The retainer assembly 220 includes a tubular diffuser or retainer 100c formed from one piece of sheet metal stamped and formed to the generally cylindrical configuration shown in FIG. 6. A pair of externally threaded weld studs 130c are secured to the retainer 100c along an imaginary baseline 222 of the retainer.

The retainer 100c includes first and second side walls 230 and 240 on opposite sides of the baseline 222. The first side wall 230 has a cylindrical portion 232 which extends about 90° around the circumference of the retainer 100c in a direction away from the baseline 222. The cylindrical portion 232 of the first side wall 230 has a cylindrical inner surface 234.

The second side wall 240 has a cylindrical portion 242 which extends about 90° around the circumference of the retainer 100c in a direction away from the baseline 222. The cylindrical portion 242 of the second side wall 240 has a cylindrical inner surface 244 which is presented toward the cylindrical inner surface 234 of the first side wall 230. The side wall inner surfaces 234 and 244 have the same radius of curvature as the cylindrical outer side surface 202 of the body portion 200 of the inflator 40c.

From the cylindrical portions 232 and 242, the side walls 230 and 240 extend in a direction generally tangential to the cylindrical inner surfaces 234 and 244. Arcuate end portions 236 and 246 of the side walls 230 and 240 are overlapped at a seam 248 diametrically opposite the baseline 222. The seam 248 may be spot welded or otherwise secured. The end portions 236 and 246 of the side walls 230 and 240, respectively, of the retainer 100c have a plurality of openings 249 for enabling flow of inflation fluid out of the retainer.

A planar end wall 250 of the retainer 100c is folded about a hinge portion 252 to an orientation generally perpendicular to the axis 60c. The end wall 250 at least partially closes the first end portion 110c of the retainer 100c. The side walls 230 and 240 and the end wall 250 define a diffuser chamber 254 inside the retainer 100c. The second end portion 120c of the retainer 100c is open to enable electrical connection with the inflator 40c.

A first clamping portion 260 of the retainer 100c includes a pair of first retaining tabs 262 and 264 located opposite each other on the side walls 230 and 240, respectively, of the retainer. A second clamping portion 270 of the retainer 100c includes a pair of second retaining tabs 272 and 274 located opposite each other on the side walls 230 and 240, respectively, of the retainer. The first retaining tabs 262 and 264 are spaced apart axially along the length of the retainer 100c from the second retaining tabs 272 and 274.

Each one of the retaining tabs 262, 264, 272 and 274 comprises a relatively small portion of the material of the retainer 100c. Each one of the retaining tabs 262, 264, 272 and 274 is formed by cutting the material of the retainer 100c along three sides of a rectangular area. The retaining tabs 262, 264, 272 and 274 are located about 120° from the baseline 222 of the retainer 100c.

The inflator 40c is inserted axially into the diffuser chamber 254 in the retainer 100c. The four retaining tabs 262, 264, 272 and 274 are then moved inwardly into clamping engagement with the outer surface 202 of the body portion 200 of the inflator 40c, at locations spaced axially along the length of the inflator. The retaining tabs 262, 264, 272, and 274 force the cylindrical body portion 200 of the inflator 40c into mating engagement with the cylindrical inner side surfaces 234 and 244 of the side walls 230 and 240, respectively, of the retainer 100c.

The first retaining tabs 262 and 264 of the retainer 100c engage a first outer surface portion 280 of the inflator 40c to block radial and axial movement of the first outer surface portion of the inflator. The second retaining tabs 272 and 274 of the retainer 100c engage a second outer surface portion 282 of the inflator 40c, spaced axially from the first outer surface portion 280, to block radial and axial movement of the second outer surface portion of the inflator. The force of the retaining tabs 262, 264, 272 and 274, clamping the inflator 40c against the retainer 100c, is sufficient to hold the inflator in position relative to the retainer. There are no fasteners, such as bolts or welds, extending between the retainer 100c and the inflator 40c.

Figures 8, 9:
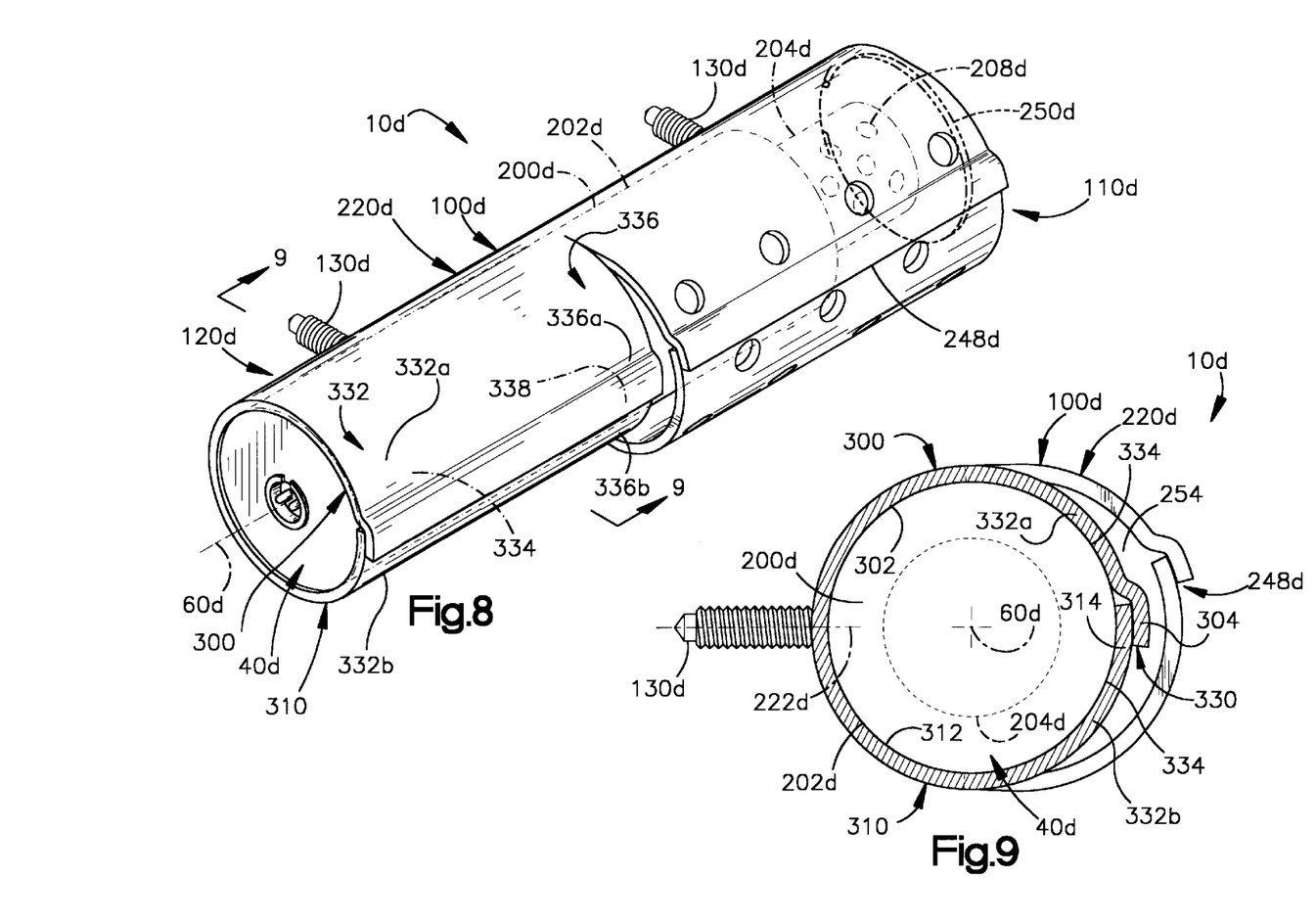
FIG. 8 is a perspective view of an air bag module constructed in accordance with a fifth embodiment of the present invention.
FIG. 9 is a sectional view taken generally along line 9—9 of FIG. 8.

FIGS. 8 and 9 illustrate portions of an air bag module 10d which is constructed in accordance with a fifth embodiment of the invention. The air bag module 10d includes an inflator 40d which is identical to the inflator 40c (FIGS. 6 and 7). The module 10d includes a retainer assembly 220d which includes a diffuser or retainer 100d for securing the inflator 40d in position relative to the seat member 12 of the vehicle seat 14 (FIG. 1).

In the embodiment illustrated in FIGS. 8 and 9, the axis 60d is similar to the axis 60 illustrated in FIGS. 1–3. The first end portion 100d is similar to the first end portion 110 illustrated in FIGS. 1–3. The second end portion 120d is similar to the second end portion 120 illustrated in FIGS. 1–3. The mounting bolts 130d are similar to the mounting bolts 130 illustrated in FIGS. 1–3.

The neck portion 204d of the inflator 40d (FIGS. 8–9) is similar to the neck portion 204 of the inflator 40c (FIGS. 6–7). The inflation fluid outlets 208d of the inflator 40d (FIGS. 8–9) are similar to the inflation fluid outlets 208 of the inflator 40c (FIGS. 6–7). The seam 248d is similar to the seam 248 illustrated in FIGS. 6 and 7. The retainer end wall 250d is similar to the retainer end wall 250 illustrated in FIGS. 6 and 7.

The retainer 100d, for about half of its length, has a configuration similar to the configuration of the retainer 100c (FIGS. 6 and 7). The remaining length of the retainer 100d includes two side wall portions 300 and 310 into which the body portion 200d of the inflator 40d is press fitted. Each one of the side wall portions 300 and 310 of the retainer 100d extends 180° circumferentially in a direction away from the baseline 222d of the retainer.

The side wall portions 300 and 310 have cylindrical inner surfaces 302 and 312, respectively. The cylindrical inner surfaces 302 and 312 have the same radius of curvature as the cylindrical outer side surface 202d of the body portion 200d of the inflator 40d. End portions 304 and 314 of the side walls 300 and 310, respectively, are overlapped at a seam 330 which is diametrically opposite the baseline 222d. The seam 330 may be spot welded or otherwise secured.

The inflator 40d is inserted axially into the retainer 100d. The body portion 200d of the inflator 40d has a press fit within the interconnected side wall portions 300 and 310 of the retainer 10d. The side wall portions 300 and 310 of the retainer 100d are in clamping engagement with the outer side surface 202d of the body portion 200d of the inflator 40d, at a plurality of locations spaced axially along the length of the inflator. Specifically, a first clamping portion 332 of the retainer 100d, including a part 332a of the first side wall 300 and a part 332b of the second side wall 310, engages a first outer surface portion 334 of the inflator 40d to block radial and axial movement of the first outer surface portion of the inflator. A second clamping portion 336 of the retainer 100d, including a part 336a of the first side wall 300 and a part 336b of the second side wall 310, engages a second outer surface portion 338 of the inflator 40d to block radial and axial movement of the second outer surface portion of the inflator. The second outer surface portion 338 of the inflator 40d is spaced apart axially from the first outer surface portion 334 of the inflator.

The force of the side wall portions 300 and 310, clamping the inflator 40d within the retainer 100d, is sufficient to hold the inflator in position relative to the inflator. There are no fasteners, such as bolts or welds, extending between the retainer 100d and the inflator 40d.

Figures 10, 11:
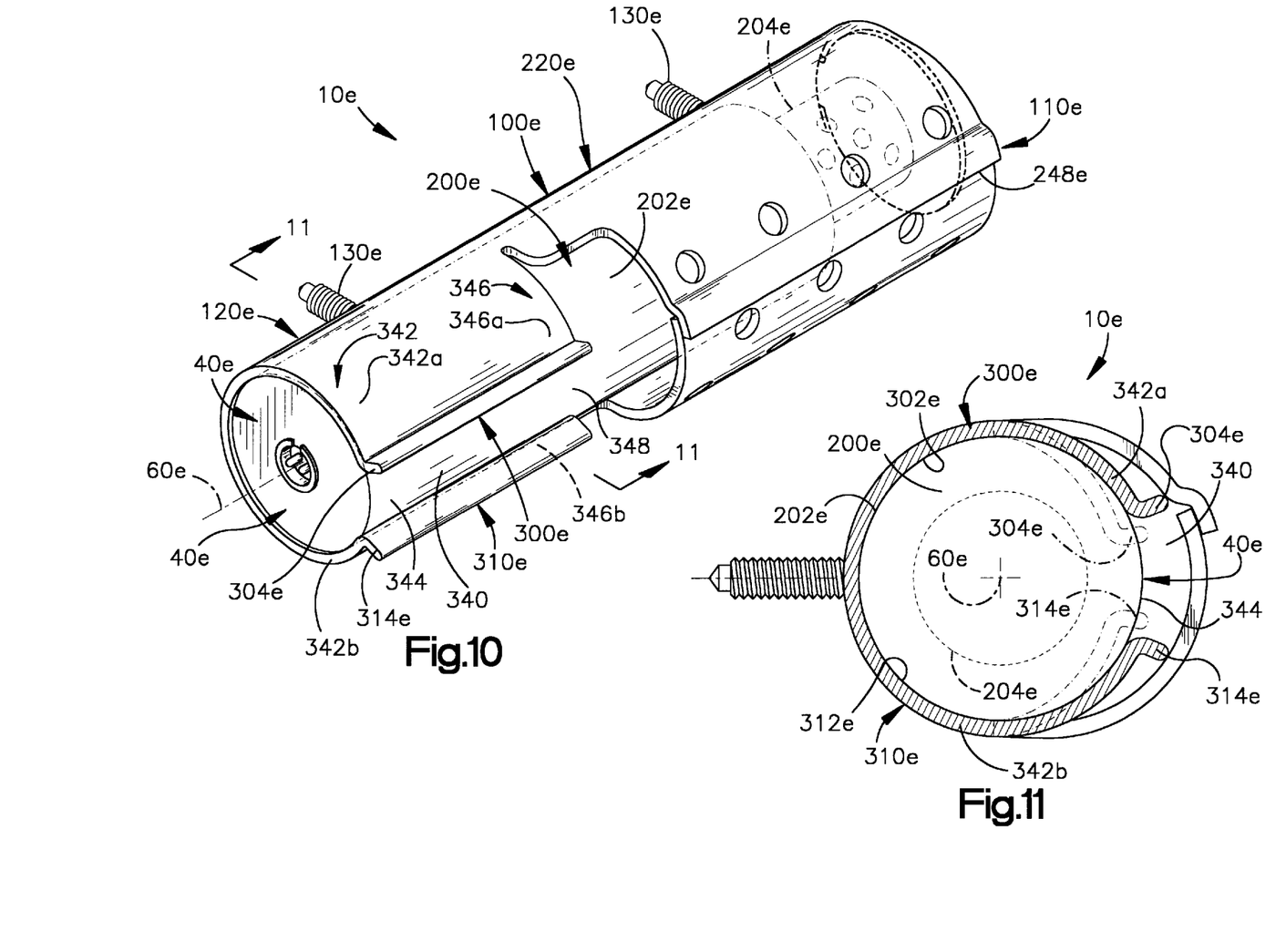
FIG. 10 is a perspective view of an air bag module constructed in accordance with a sixth embodiment of the present invention.
FIG. 11 is a sectional view taken generally along line 11—11 of FIG. 10.

FIGS. 10 and 11 illustrate portions of an air bag module 10e which is constructed in accordance with a sixth embodiment of the invention. The air bag module 10e includes an inflator 40e which is identical to the inflator 40c (FIGS. 6 and 7). The module 10e includes a tubular retainer assembly 220e which includes a tubular diffuser or retainer 100e for securing the inflator 40e in position relative to the seat member 12 of the vehicle seat 14 (FIG. 1).

In the embodiment illustrated in FIGS. 10 and 11, the axis 60e is similar to the axis 60 illustrated in FIGS. 1–3. The first end portion 110e is similar to the first end portion 110 illustrated in FIGS. 1–3. The second end portion 120e is similar to the second end portion 120 illustrated in FIGS. 11–3. The mounting bolts 130e are similar to the mounting bolts 130 illustrated in FIGS. 1–3.

The neck portion 204e of the inflator 40e (FIGS. 10–11) is similar to the neck portion 204 of the inflator 40c (FIGS. 6–7). The seam 248e is similar to the seam 248 illustrated in FIGS. 6 and 7.

The retainer 100e has a configuration similar to the configuration of the retainer 100d (FIGS. 8 and 9). In the retainer 100e, however, the side wall portions 300e and 310e do not extend around substantially the entire circumferential extent of the body portion 200e of the inflator 40e. Rather, each one of the side wall portions 300e and 310e extends around only about 150°–160° of the circumference of the body portion 200e of the inflator 40e. Outwardly flared end portions 304e and 314e of the side wall portions 300e and 310e, respectively, are spaced apart to define a gap 340.

The side wall portions 300e and 310e have a cylindrical configuration with cylindrical inner surfaces 302e and 312e, respectively. The cylindrical inner surfaces 302e and 312e of the side wall portions 300e and 310e, respectively, have the same radius of curvature as the cylindrical outer side surface 202e of the body portion 200e of the inflator 40e.

The retainer 100e is formed with the side wall portions 300e and 310e in a radially inward configuration as shown in phantom in FIG. 11. The side wall portions 300e and 310e are resilient and are movable radially outward, against the bias of the material of the retainer 100e, to a position as shown in solid lines in FIG. 11.

The inflator 40e is inserted into the retainer 100e through the gap 340 between the end portions 304e and 314e of the side wall portions 300e and 310e of the retainer. The body portion 200e of the inflator 40e forces the side wall portions 300e and 310e of the retainer 100e radially outward. The side wall portions 300e and 310e of the retainer 100e snap into place against the outer side surface 202e of the body portion 200e of the inflator 40e when the inflator moves into the position shown in FIGS. 10 and 11 coaxial with the retainer.

The side wall portions 300e and 310e of the retainer 100e are in clamping engagement with the outer side surface 202e of the body portion 200e of the inflator 40e, at a plurality of locations spaced axially along the length of the inflator. Specifically, a first clamping portion 342 of the retainer 100e, including a part 342a of the first side wall 300e and a part 342b of the second side wall 310e, engages a first outer surface portion 344 of the inflator 40e to block radial and axial movement of the first outer surface portion of the inflator. A second clamping portion 346 of the retainer 100e, including a part 346a of the first side wall 300e and a part 346b of the second side wall 310e, engages a second outer surface portion 348 of the inflator 40e to block radial and axial movement of the second outer surface portion 348 of the inflator. The second outer surface portion 348 of the inflator 40e is spaced apart axially from the first outer surface portion 344 of the inflator. The force of the side wall portions 300e and 310e, clamping the inflator 40e within the retainer 100e, is sufficient to hold the inflator in position relative to the inflator. There are no fasteners, such as bolts or welds, extending between the retainer 100e and the inflator 40e.

From the above description of the invention, those skilled in the art will perceive improvements, changes and modifications in the invention. For example, the second end portion of the diffuser need not have the curled configuration shown in FIGS. 3 and 5, but instead may have a different configuration, such as one similar to the configuration of the first end portion 110 of the diffuser 100. Thus, the second end portion of the diffuser may comprise one or more wall portions which extend radially inward, and perhaps axially in a direction away from the first end portion of the diffuser, but not axially in a direction toward the first end portion of the diffuser. Also, the first end portion of the diffuser could have a curled configuration similar to the configuration of the second end portion 120 of the diffuser 100. In either case, the inflator would still be clamped axially, between the diffuser end portions, with a force of from about 80 pounds to about 300 pounds. Further, a member such as the cushion 170 could be provided between the first end portion of the inflator and the first end portion of the diffuser, particularly if the first end portion of the inflator has a domed or non-flat configuration. Such improvements, changes and modifications within the skill of the art are intended to be covered by the appended claims.

Having described the invention, We claim:

1. A vehicle safety apparatus for helping to protect an occupant of a vehicle in the event of an impact to the vehicle, said apparatus comprising:

an inflatable occupant protection device having a deflated condition and being inflatable into a position adjacent to the vehicle occupant for helping to protect the vehicle occupant;

an inflator which is actuatable to provide inflation fluid for inflating said inflatable device, said inflator having a longitudinal axis, a first terminal end surface, a second terminal end surface, and a central portion between said first and second terminal end surfaces;

a one-piece diffuser receiving said inflator, said one-piece diffuser having a central wall portion and first and second opposite end portions;

means for supporting said diffuser and said inflator on the vehicle;

said central wall portion of said diffuser being spaced radially outward from said central portion of said inflator to define a diffuser chamber between said central wall portion of said diffuser and said central portion of said inflator;

said first end portion of said diffuser extending radially inward from said central wall portion of said diffuser and radially inward of said first terminal end surface of said inflator and blocking axial movement of said inflator in a first axial direction; and said second end portion of said diffuser having a radial portion extending radially inward from said central wall portion of said diffuser in a direction toward said longitudinal axis and radially inward of said second terminal end surface of said inflator, said radial portion of said diffuser blocking radial movement of said second terminal end surface of said inflator and blocking axial movement of said inflator in a second axial direction opposite to said first axial direction.

2. An apparatus as set forth in claim 1 wherein said radial portion of said diffuser comprises a cylindrical wall portion of said diffuser which has an arcuate portion extending radially inward from said central wall portion of said diffuser.

3. An apparatus as set forth in claim 2 wherein said arcuate portion of said radial portion of said diffuser does not extend axially in a direction toward said first end portion of said diffuser.

4. An air bag module comprising:

an elongate inflator having first and second axially spaced terminal end surfaces;

a one-piece tubular retainer assembly at least partially enclosing said inflator; and means for securing said inflator and said retainer assembly together, consisting of (a) a first clamping portion of said tubular retainer assembly engaging said first terminal end surface of said inflator and blocking movement of said first terminal end surface of said inflator relative to said tubular retainer assembly, and (b) a second clamping portion of said tubular retainer assembly engaging said second terminal end surface of said inflator and blocking movement of said second terminal end surface of said inflator relative to said tubular retainer assembly.

5. An air bag module as set forth in claim 4 wherein said retainer assembly consists essentially of a tubular metal retainer having at least one opening for enabling flow of inflation fluid out of said retainer assembly.

6. An air bag module as set forth in claim 4 wherein said inflator has a cylindrical outer surface which extends for substantially the entire length of said inflator, said first terminal end surface of said inflator comprising an engagement surface on said inflator disposed radially inward of said cylindrical outer surface said inflator, said first clamping portion of said tubular retainer assembly extending radially inward of said cylindrical outer surface and engaging said engagement surface on said inflator.

7. An air bag module as set forth in claim 6 wherein said inflator has an end portion and said engagement surface on said inflator is on an end portion of said inflator.

8. An air bag module as set forth in claim 4 wherein said second clamping portion of said tubular retainer assembly comprises a radial wall portion extending radially inward from a central wall portion of said tubular retainer assembly in a direction toward a longitudinal axis of said inflator.

9. An air bag module as set forth in claim 8 wherein said radial portion of said tubular retainer assembly comprises a cylindrical wall portion of said tubular retainer assembly which has an arcuate portion extending radially inward from said central wall portion of said tubular retainer assembly, and wherein said arcuate portion of said radial portion of said tubular retainer assembly does not extend axially in a direction toward said first clamping portion of said tubular retaining assembly.

10. An air bag module as set forth in claim 4 wherein said tubular retainer assembly comprises a tubular member having a generally cylindrical wall portion, said first and second clamping portions of said tubular retainer assembly being spaced apart along the length of said tubular member and extending radially inward from said generally cylindrical wall portion into engagement with said first and second terminal end surfaces of said inflator.

11. A vehicle safety apparatus for helping to protect an occupant of a vehicle in the event of an impact to the vehicle, said apparatus comprising:

an inflatable occupant protection device having a deflated condition and being inflatable into a position adjacent to the vehicle occupant for helping to protect the vehicle occupant;

an inflator which is actuatable to provide inflation fluid for inflating said inflatable device, said inflator having a longitudinal axis, a first terminal end surface, a second terminal end surface, and a central portion between said first and second terminal end surfaces;

a one-piece diffuser receiving said inflator, said one-piece diffuser having a central wall portion and first and second opposite end portions;

means for supporting said diffuser and said inflator on the vehicle;

said central wall portion of said diffuser being spaced radially outward from said central portion of said inflator to define a diffuser chamber between said central wall portion of said diffuser and said central portion of said inflator;

said first end portion of said diffuser extending radially inward from said central wall portion of said diffuser and radially inward of said first terminal end surface of said inflator and blocking axial movement of said inflator in a first axial direction; and said second end portion of said diffuser having a radial portion extending radially inward from said central wall portion of said diffuser in a direction toward said longitudinal axis and radially inward of said second terminal end surface of said inflator, said radial portion of said diffuser blocking radial movement of said second terminal end surface of said inflator and blocking axial movement of said inflator in a second axial direction opposite to said first axial direction;

wherein said radial portion of said diffuser is spaced apart from said second terminal end surface of said inflator, said apparatus further comprising a cushion disposed intermediate said radial portion of said diffuser and said second terminal end surface of said inflator, said radial portion of said diffuser clamping said cushion against said second terminal end surface of said inflator to block radial and axial movement of said second terminal end surface of said inflator.

12. An apparatus as set forth in claim 11 wherein said cushion is made from a compressible material.

13. An apparatus as set forth in claim 11 wherein said inflator is clamped axially between said cushion and said first end portion of said diffuser, said inflator being free of other connections with said diffuser.

14. An air bag module comprising:

an elongate inflator having first and second axially spaced terminal end surfaces;

a tubular retainer assembly at least partially enclosing said inflator; and means for securing said inflator and said retainer assembly together, consisting of (a) a first clamping portion of said tubular retainer assembly engaging said first terminal end surface of said inflator and blocking movement of said first terminal end surface of said inflator relative to said tubular retainer assembly, and (b) a second clamping portion of said tubular retainer assembly engaging said second terminal end 15. An air bag module comprising:

an elongate inflator having first and second axially spaced terminal end surfaces;

a one-piece tubular retainer assembly at least partially enclosing said inflator; and means for securing said inflator and said retainer assembly together, consisting of (a) a first clamping portion of said tubular retainer assembly engaging said first terminal end surface of said inflator and blocking movement of said first terminal end surface of said inflator relative to said tubular retainer assembly, and (b) a second clamping portion of said tubular retainer assembly engaging said second terminal end surface of said inflator and blocking movement of said second terminal end surface of said inflator relative to said tubular retainer assembly;

wherein said second clamping portion of said tubular retainer assembly has a curl portion extending radially inward in a direction toward a longitudinal axis of said inflator and toward said first clamping portion of said tubular retainer assembly, said curl portion blocking movement of said second terminal end surface of said inflator relative to said tubular retainer assembly.

16. An air bag module as set forth in claim 15 wherein said curl portion comprises a cylindrical wall portion of said tubular retainer assembly which is curled radially inward and axially in a direction toward said first clamping portion of said tubular retainer assembly about a circular bending axis which is centered on said longitudinal axis.

* * * * *

UNITED STATES PATENT AND TRADEMARK OFFICE
CERTIFICATE OF CORRECTION

PATENT NO. : 5,918,898
DATED : July 6, 1999
INVENTOR(S) : John P. Walker, et al.

It is certified that error appears in the above-identified patent and that said Letters Patent is hereby corrected as shown below:

Column 14, line 6, after "end" insert -- surface of said inflator and blocking movement of said second terminal end surface of said inflator relative to said tubular retainer assembly;
wherein said retainer assembly comprises a one-piece tubular metal retainer having at least one opening for enabling flow of inflation fluid out of said retainer assembly, said second clamping portion of said retainer assembly including a compressible cushion disposed intermediate said tubular metal retainer and said second terminal end surface of said inflator, said tubular metal retainer clamping said cushion against said second terminal end surface of said inflator.

Signed and Sealed this

Twelfth Day of December, 2000

Attest:

Q. TODD DICKINSON

*Attesting Officer*  *Director of Patents and Trademarks*